(12) United States Patent
Wehler et al.

(10) Patent No.: US 7,650,743 B2
(45) Date of Patent: Jan. 26, 2010

(54) LINE GUIDANCE UNIT FOR THE ACTIVE GUIDANCE OF LINES, CABLES OR SIMILAR

(75) Inventors: Herbert Wehler, Neunkirchen (DE); Uwe Kemper, Kreuztal (DE)

(73) Assignee: Kabelschlepp GmbH, Siegen (DE)

( * ) Notice: Subject to any disclaimer, the term of this patent is extended or adjusted under 35 U.S.C. 154(b) by 188 days.

(21) Appl. No.: 10/510,290

(22) PCT Filed: Apr. 4, 2003

(86) PCT No.: PCT/EP03/03536

§ 371 (c)(1),
(2), (4) Date: Mar. 11, 2005

(87) PCT Pub. No.: WO03/085794

PCT Pub. Date: Oct. 16, 2003

(65) Prior Publication Data

US 2005/0155338 A1 Jul. 21, 2005

(30) Foreign Application Priority Data

Apr. 11, 2002 (DE) ................ 102 16 043

(51) Int. Cl.
F16G 13/00 (2006.01)
F16L 3/00 (2006.01)

(52) U.S. Cl. .................... 59/78.1; 248/49
(58) Field of Classification Search ............ 59/78.1; 248/49, 51
See application file for complete search history.

(56) References Cited

U.S. PATENT DOCUMENTS 3,772,875 A * 11/1973 Viano .................. 59/78.1
5,836,148 A * 11/1998 Fukao .................. 59/78.1
6,354,070 B1 * 3/2002 Blase .................. 59/78.1

FOREIGN PATENT DOCUMENTS

EP 0 789 167 A1 8/1997
WO WO 98/40645 9/1998
WO WO 02/03521 A1 1/2002

* cited by examiner

Primary Examiner—Dana Ross
Assistant Examiner—Teresa M Bonk
(74) Attorney, Agent, or Firm—Smith Law Office

(57) ABSTRACT

A line guidance unit, for the guidance of lines, cables or similar, with a fist end (10) which may be fixed and a second end (11) which is displaceable; is disclosed. The line guidance unit (2) comprises a channel (12), embodied as segments (13). The segments are connected with at least one support strip (1). The line guidance unit comprises means which embody the line guidance unit (2) in an arc relative to a straight line joining the both ends (10, 11), in the extended state.

24 Claims, 7 Drawing Sheets

LINE GUIDANCE UNIT FOR THE ACTIVE GUIDANCE OF LINES, CABLES OR SIMILAR

The object of the invention refers to a line guidance unit for active guidance of lines, cables or similar or similar flexible member.

Line guidance for the active guidance of lines, cables or similar or similar flexible member, with a first end which is in a fixed location and with a second end which is movable, are known in numerous embodiments. The classical line guidance unit, which is also called an energy guide chain or energy chain consists of individual chain links which form a guidance channel. Lines, cables or similar are arranged in this guidance channel.

A line guidance unit is known from WO 98/40645 which consists of one-piece protective elements made from plastic. The protective element is made in one piece by injection molding or casting and, among others, it has parts that are joined with bendable bridges. The protective element is a bottom element with a top side and bottom side and at least one wall segment, which can be formed by bending and/or folding in the direction of the top side of the bottom segment, by mechanical closing of closing mechanisms to form a closed channel section, where the protective element is preferably joined to other similar protective elements or can be joined to these so that the channel sections form a channel for lines in the longitudinal direction.

Figure 1:
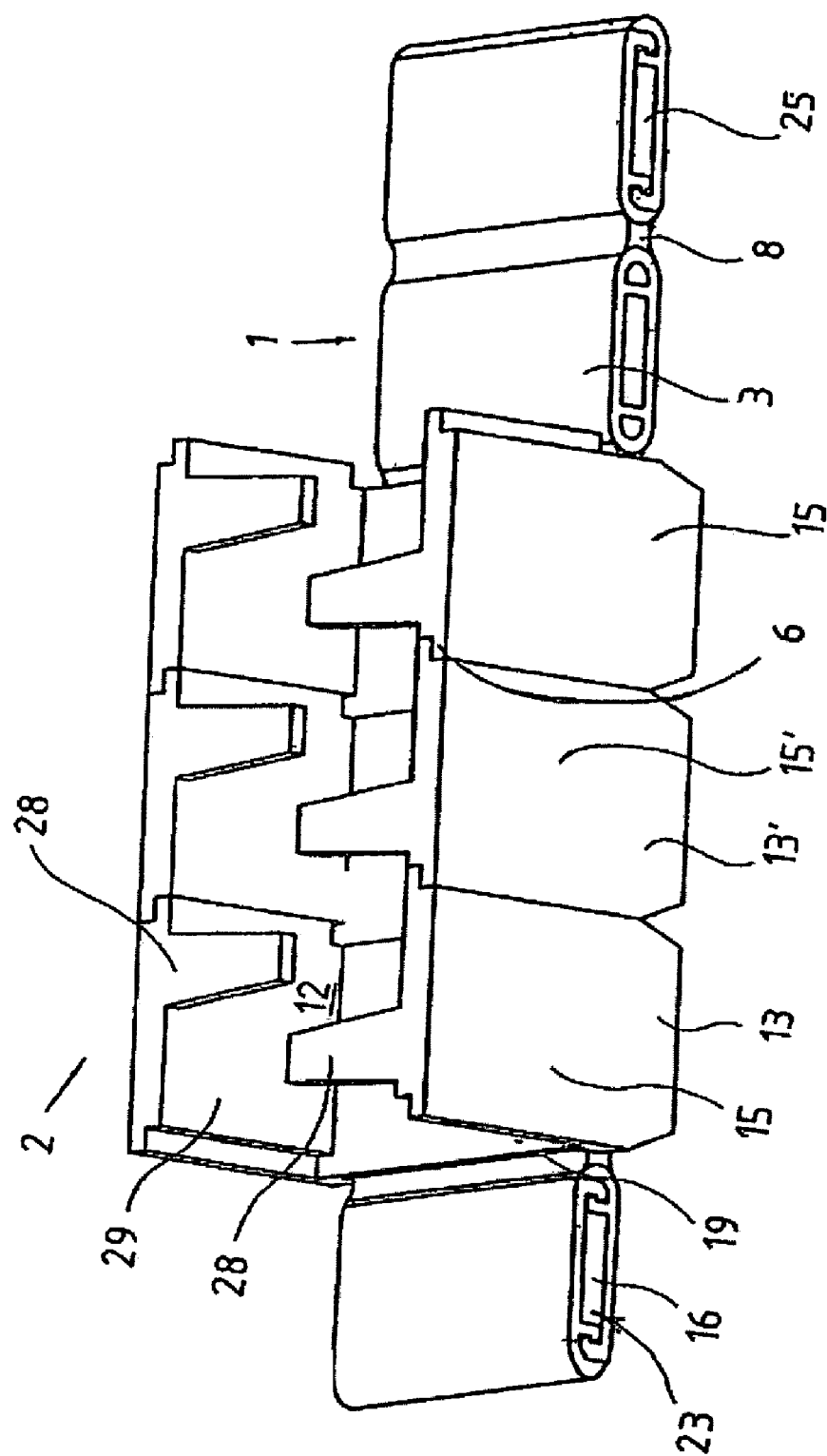

Another embodiment of a line guidance unit is known from EP 0 789 167 A1. This line guidance unit also serves for active guidance of lines, cables or similar, with a first end which is at a fixed location and with a second end which is movable. The line guidance unit has a channel which is formed by segments, the segments being connected with a support strip. During the operation of the line guidance unit, it forms also the support strip a lower trunk and an upper trunk as well as a curved region lying between the lower trunk and upper trunk, as it is represented in FIG. 1 of WO 98/40645 or in FIG. 13 of EP 0 789 167 A1.

Based on this, the goal of the present invention is to provide a line guidance unit which has higher load-bearing capacity. This task is solved according to the invention by a line guidance unit having a loaded condition and an unloaded condition; a first fixed end, a second movable end; a plurality of segments; a support strip joining the segments; and a pretensioner joined to the segments to dispose the line guidance unit in an arc-shape when the line guidance unit is in an unloaded extended condition for resisting loads when the line guidance unit is in the loaded extended condition. Advantageous further developments and embodiments, which can be used individually or combined with one another in any arbitrary manner, are the object of the dependent claims.

The line guidance unit according to the invention serves for the guidance of lines, cables or similar, with a first end, which can be fixed, and with a second end which is movable. The line guidance unit has a channel which is formed by segments. The segments are connected to at least one support strip. In order to increase the load-bearing capacity of the line guidance unit, it is proposed that the segments have means through which the line guidance unit in the extended state lies in an arc relative to the straight line connecting the two ends. With this means, the light line guidance unit receives a pre-stressing, so that after the lines, cables or similar are introduced into the line guidance unit, sagging of the line guidance unit is prevented. The extent of pre-stress which is applied to the line guidance unit can be selected as a function of the means. The strength values of the segment and of the support strip must always be taken into consideration.

The means include at least one common contact surface, the imaginary lengthening of which intersects the straight line that connects the two ends of the line guidance unit in the extended state. The angle can be smaller or equal to 90°.

A design of the line guidance unit in which the means are formed on at least one side wall is preferred. This can also result in increased stability of the line guidance unit so that improved torsional strength of the line guidance unit is achieved. Separately it is proposed that for this purpose the means be formed on the overlapping regions of neighboring segments.

Specifically, it is proposed that a segment which has the means have at least one protrusion so that the protrusion lies against a neighboring segment in the extended state of the line guidance unit.

According to another further advantageous embodiment of the line guidance unit, it is proposed that the support strip have alternating support sections and linking sections and that the support sections and the linking sections be made of materials with different properties using the multi-component injection method.

Using this embodiment according to the invention, it is achieved that the curved region which is produced in the formation of an upper trunk and lower trunk is relatively small because only the linking section with its bending strength influences this. Hereby the support section can be formed as an essentially rigid body, while the linking section that joins the two support sections is made of a material which is very bendable. By suitable selection of the material from which the linking section is formed, the bendability of the linking section can be varied and also adjusted to the requirements of the curved region of the lines or tubings.

The support strip with its support sections and linking sections is preferably produced by the multi-component injection method. Alternatively, the support sections and the linking sections can be produced according to the multi-component extrusion method. If the multi-component extrusion method is used, the support strip can be extruded as such. Alternatively, first a plate-shaped blank with carrying and link sections can be formed which is then divided transversely to the extrusion direction. This method of producing the support strip also has the advantage that support strips with different widths can be produced.

In order to reduce the weight of the support strip itself and to increase the strength, it is proposed that at least the support sections be formed as profiles, preferably as hollow profiles. Especially, the formation of the support sections as hollow profiles also has the advantage that relatively high savings in material is achieved, which results in a more economical manufacture of the support strip. Furthermore, when the support strip is designed as a hollow profile, the support strip will have increased stiffness.

The support strip of the line guidance unit for active guidance of lines, cables or similar preferably includes at least two support strip sections joined together. The joining of several sections makes it possible to produce support strips of arbitrary length. Also, with such joining, the length of the support strip can be adjusted exactly to the particular application according to a modular concept. The possibility also exists of arranging several sections next to one another and connecting these so that this will increase the possible variations of the widths of the support strip and thus of the line guidance unit. Moreover, a support strip section can be joined with at least two other support strip sections. Here a division or combination of lines, cables or similar guided in a line guidance unit to at least two line guidance units is made possible.

The support strip sections are joined together preferably by positive and/or non-positive locking. Especially, it is proposed that the sections be joined so that they can be separated. The possibility of separation results in special flexibility when using the support strips. Especially, long support strips can be shortened again without difficulties when needed. Alternatively, the support strip section can be joined so that they cannot be separated. Hereby, the possibility exists to join the support strip sections with suitable joining means. The joining means can be, for example, holding clips. Instead of using joining means for forming a non-separable joint between the support strips, according to an additional proposal, the support strips can be glued or welded together.

In an advantageous embodiment of the invention, the support sections have a trapezoidal and/or rhomboidal shape. With the aid of trapezoidal and/or rhomboidal support sections, the path assumed by the support strip in three-dimensional space can be influenced and tailor-made. Especially, when isosceles trapezoids are used, the carrier support strip describes a helix, where the slope of the helix is determined by the angle of the support sections to one another. With such a support strip, for example, lines of a robot arm, that carries out a sliding rotational movement, that is, a combination of a translational movement and rotational movement, can be guided reliably. Alternatively, the link sections are made trapezoidal and/or rhomboidal. By having a trapezoidal and/or rhomboidal design of the link sections, the elastic properties of the support strip are influenced. Especially in this way tilting movements around an axis lengthwise to the support strip can be allowed.

The line guidance unit has a channel which is formed by segments that are connected with a support strip. Here, the spatial requirement for the incorporation of the line guidance unit is reduced. There is also the possibility that the segments are connected to each support section. This is not absolutely necessary. Thus, selected support sections can be joined with segments. Also, several support sections can be joined to only one segment. In this way, the stiffness of the line guidance unit is influenced, which is especially important when a long line guidance unit must be pushed together, jolted, stacked or rolled up and exposed to pressure. By stiffening several support sections, the behavior of the line guidance unit can be determined in a designed manner in case of exposure to pressure. Especially, in order to achieve a particularly tight packing of a composed energy guide chain, the number of layers into which a line guidance unit will be folded when it is pushed together can be predetermined in a controlled manner.

For slight adjustment of the line guidance unit according to the invention to different cases of application, it is proposed that the segments be joined to the support sections with positive or non-positive locking. Especially it is proposed to join the segments to the support sections so that they can be separated. Instead of having a separable joint of the individual segments to the support sections, it is also possible to join the segments to the support sections so that they cannot be separated. This can be done, for example, by gluing or welding.

Especially, it is proposed that, in order to produce separable joining of the segments to the support sections, the latter have some joining means. The joining means can be designed as clip arrangements or plug-in connections.

Preferably, a line guidance unit is proposed in which the segments have side walls and each support section has at least one side wall has connecting means, such as a recess and/or a first protrusion which is designed so that the first protrusion engages in the recess. As a result of this the possibility is achieved to provide a simple and compact construction for the line guidance unit according to the invention. Especially, with this measure, the line guidance unit can be adapted to any specific case of application according to the modular principle.

According to still another advantageous embodiment of the line guidance unit, it is proposed that at least one support section have a lead-through running in the longitudinal direction, through which at least one connecting element extends, which joins the side walls of a segment. As a result of this, a modular-type design of the line guidance unit is provided which exhibits high flexibility regarding different cases of application, and where the number of the components necessary for constructing the line guidance unit is relatively small.

In order to simplify the mounting of the line guidance unit, according to a still further advantageous embodiment of the line guidance unit according to the invention, it is proposed that at least one segment have side walls which are connected through a first transverse bridge. Each of the side walls has a second protrusion which face each other and the support section is arranged between the first transverse bridge and the second protrusions. By pressing together the end regions of the side walls which lie opposite the first and the second protrusions, respectively, the distance between the protrusions is increased so that the strip can be introduced into the free space lying between the first transverse bridge and the protrusions, without complicated handling being needed for this.

Advantageously, at least one segment has side walls which are joined through a second transverse bridge. The second transverse bridge contributes to the stiffness of the line guidance unit. It may also serve to cover the inside space of the line guidance unit by having the second transverse bridge essentially covering the segment. Alternatively, at least one segment has side walls where at least one side wall has a partial bridge which is facing the opposite side wall. With the aid of the partial bridge, lines, cables or similar can be simply inserted or taken out from the line guidance unit. With the aid of a partial bridge, it is also possible to increase the distance between the protrusions by pressing together the opposite end regions of the side walls, in order to introduce the support strip into the free space between the first transverse bridge and the protrusions.

Advantageously, at least two neighboring segments each have a side wall, where at least one side wall has an overlap region which overlaps the other side wall. The overlap region can have two functions: first of all, it provides sealing between the segments so that the lines, cables or similar are exposed less to the environmental influences. On the other hand, the overlap region provides improved stability, especially it provides higher stiffness of the line guidance unit against undesirable twisting or tilting of the segments with respect to one another.

Preferably, the overlap is essentially designed as a circular segment. Here, preferably, the circular segment is dimensioned based on the tilting angle of the support sections. The overlap region of a circular segment shape imparts high stiffness and good sealing to the line guidance unit with low material consumption, and the weight of the line guidance unit is thus reduced.

In a special embodiment, the segments are connected with two support strips. In this case, the support strips are essentially parallel. As a result of the parallel arrangement of the support strips, comparatively wide line guidance units can be built with a low height. Especially, in this way, material can be saved. Here too, the width of the line guidance unit can be adjusted to the particular case of application.

Additional details and advantages of the support strip according to the invention as well as of the line guidance unit according to the invention will be explained below with the aid of the practical examples shown in the drawing, without the object of the invention being limited by these practical examples.

Figure 2:
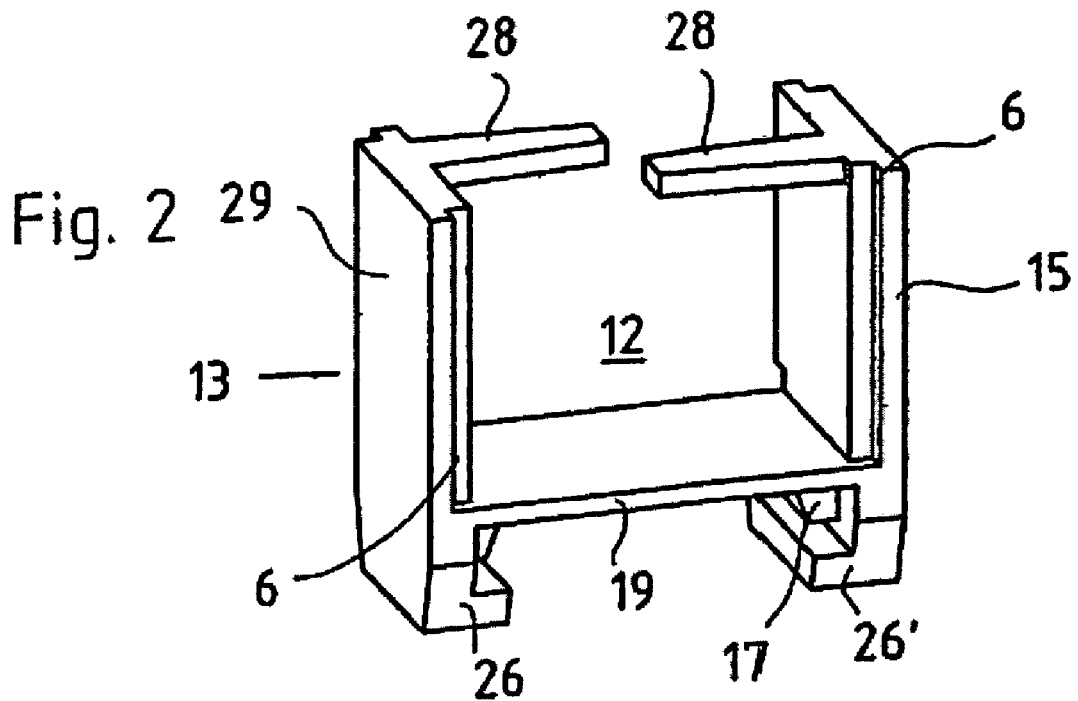
Figure 3:
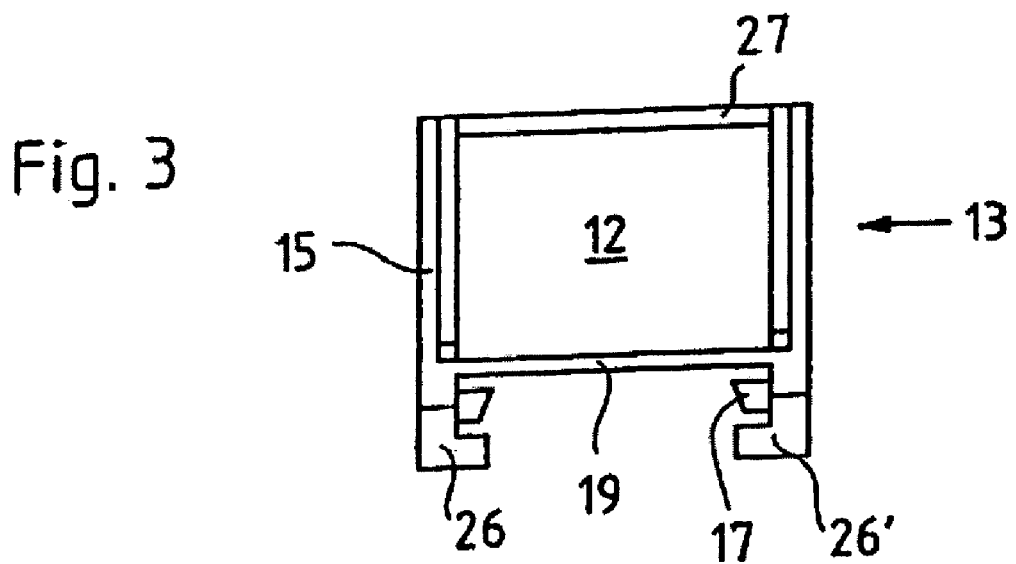
Figure 4:
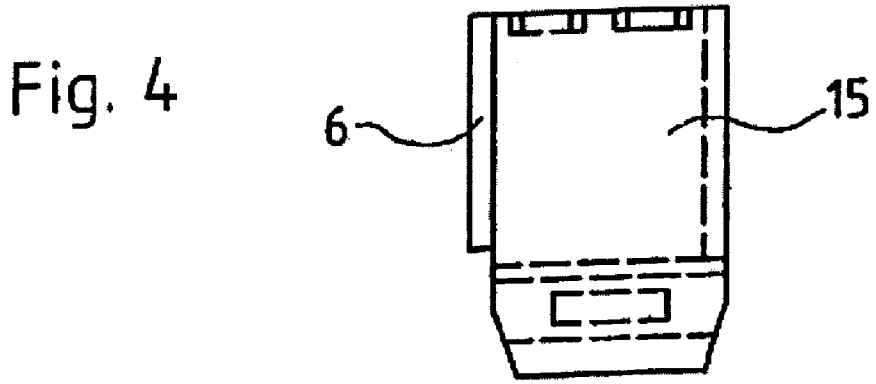
Figure 5:
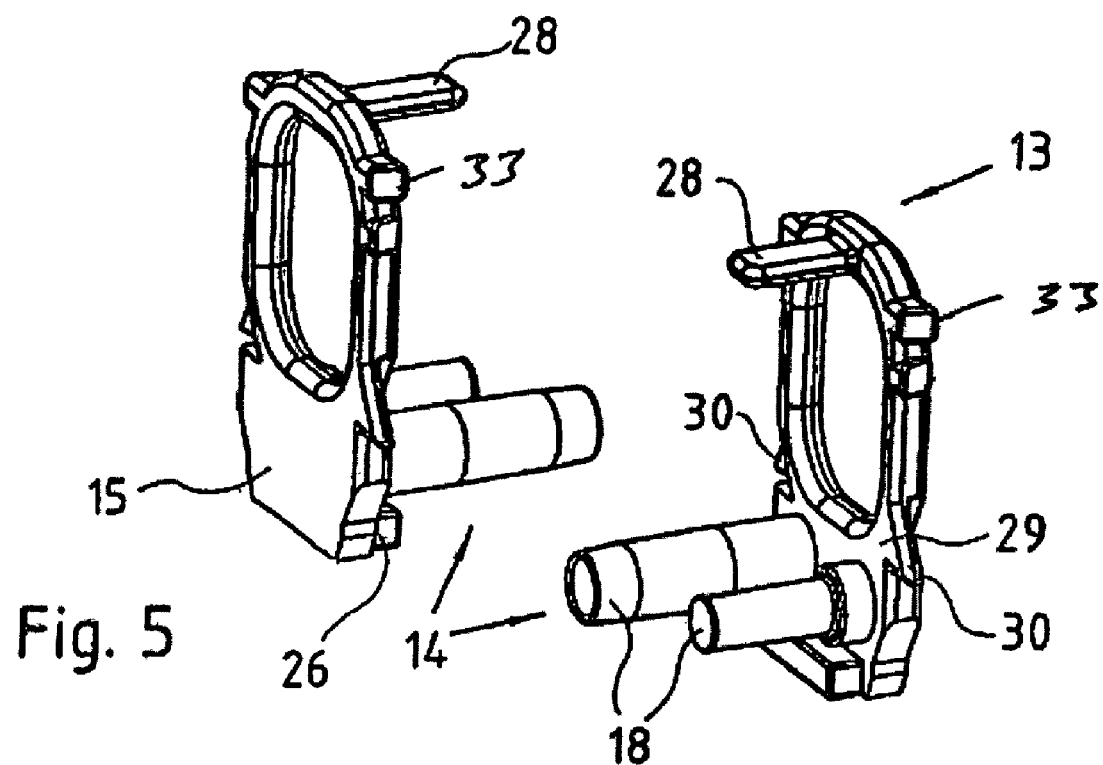
Figure 6:
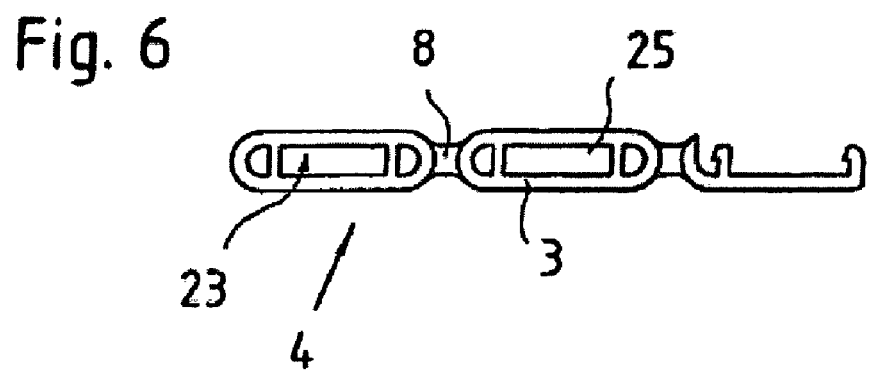
Figure 7:
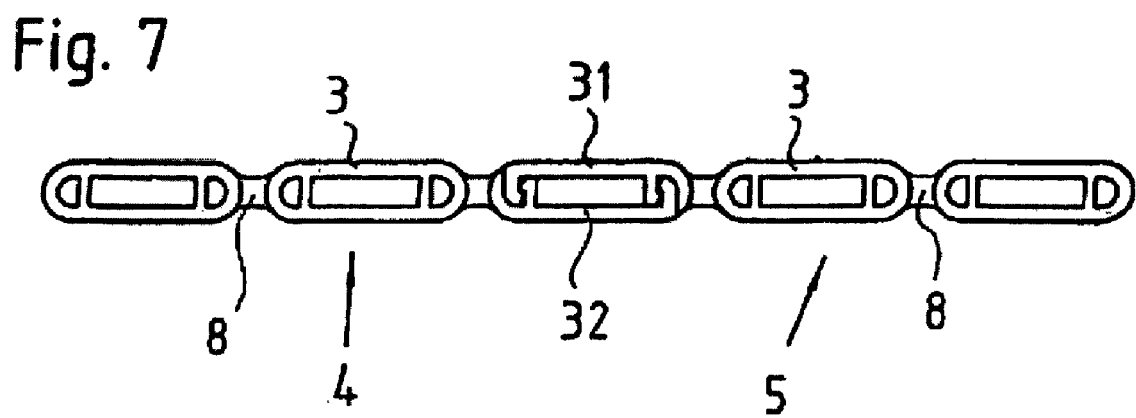
Figure 8:
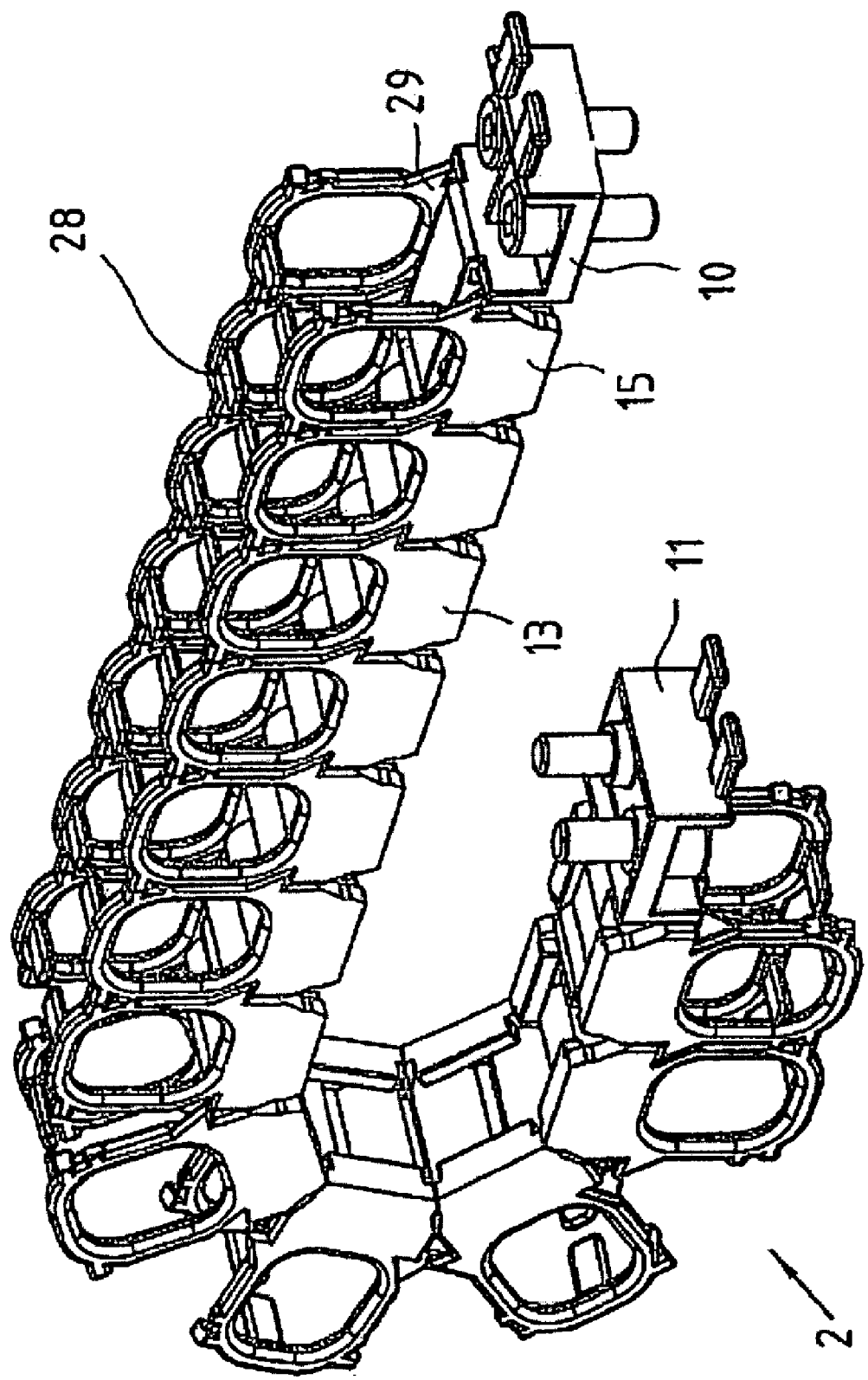
Figure 9:
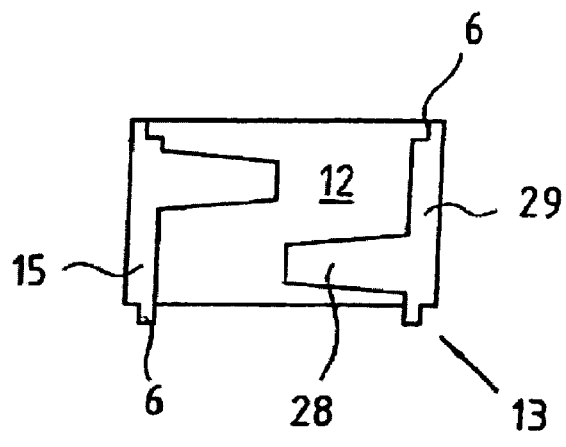
Figure 10:
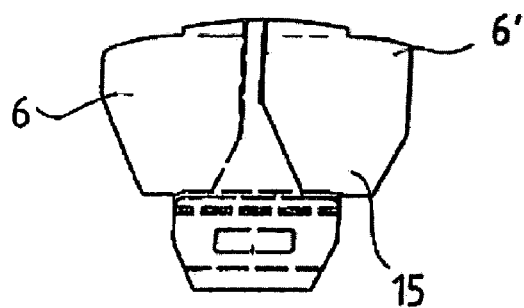
Figure 11:
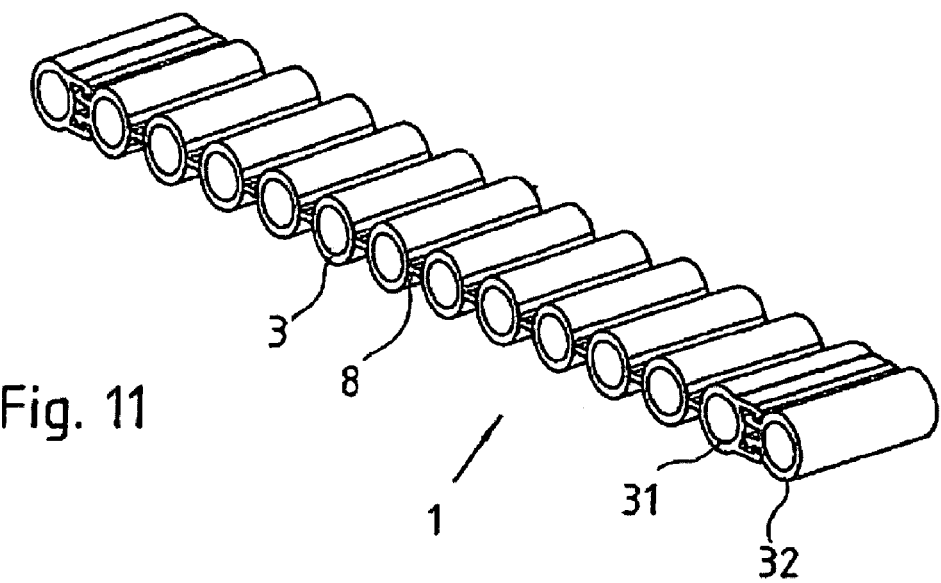
Figure 12:
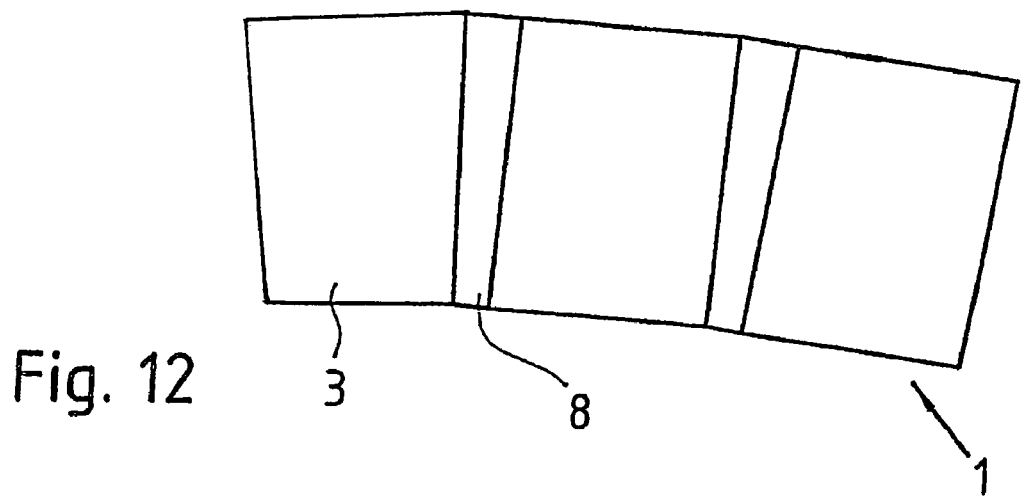
Figure 13:
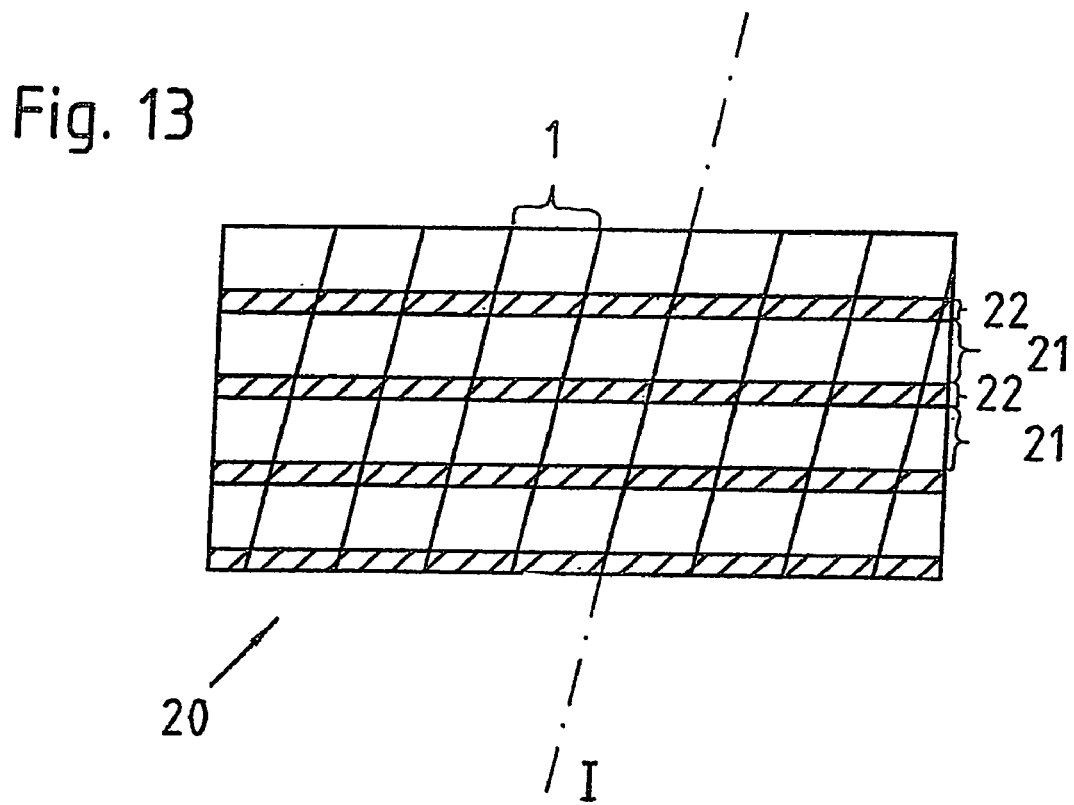
Figure 14:
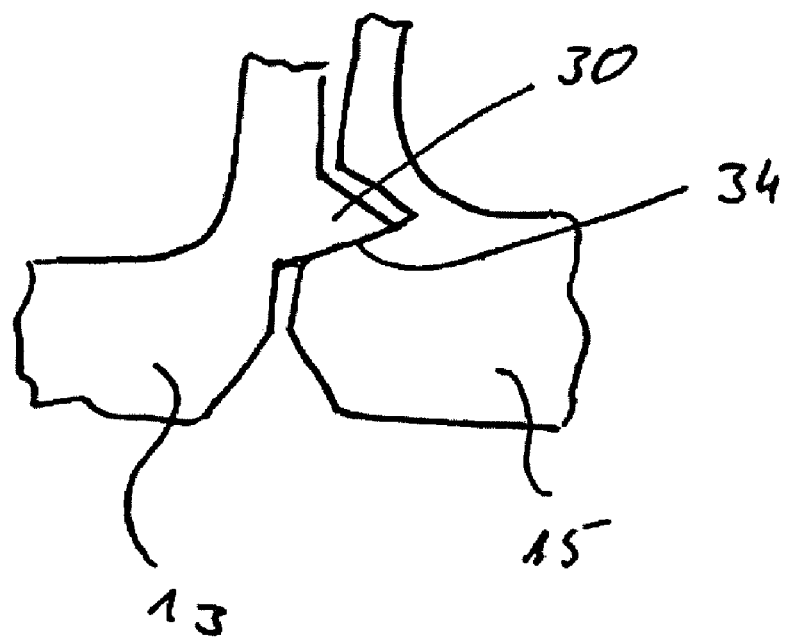

The following are shown schematically:

FIG. 1 shows a line guidance unit according to the invention is a perspective slanted view, FIG. 2 shows a segment of the line guidance unit according to the invention according to FIG. 1, in the perspective slanted view, FIG. 3 shows an alternative embodiment of the segment according to FIG. 2 in a front view, FIG. 4 shows the segment according to FIG. 2 in a side view FIG. 5 is an alternative embodiment of a segment for a further line guidance unit according to the invention in a perspective slanted view, FIG. 6 is a section of the support strip according to the invention in a longitudinal section, FIG. 7 shows two sections according to FIG. 6 joined together, FIG. 8 shows an energy guidance unit according to the invention with segments according to FIG. 5, FIG. 9 shows a segment according to FIG. 2 in a top view, FIG. 10 is an alternative embodiment of a side wall according to FIG. 4 in a side view, FIG. 11 is another support strip according to the invention in a perspective slanted view, FIG. 12 is an alternative support strip according to the invention in a top view, FIG. 13 is a plate for the production of a support strip according to the invention in a top view, and FIG. 14 is a partial side view of a pretensioner in accordance with the present invention.

FIG. 1 shows a line guidance unit 2 according to the invention with a support strip 1 according to the invention in a slanted perspective view, where support strip 1 has support sections 3 and link sections 8, which are joined together with the aid of a two-component injection technique. Segments 13, 13' are secured on support strip 1, and these have side walls 15, 15' as a result of which a channel 12 is created which can hold lines or cables or similar, which are not shown. Each side wall 15 has a side wall 29 opposite to it. Side walls 15, 15' each have a partial bridge 28 which extends in the direction of the opposite side wall 29. Simple introduction of lines or cables into channel 12 is possible with the aid of partial bridges 28.

The support sections 3 are designed with a profile 23 which reduces the weight of the support strip 1 and increases the stiffness of support section 3. The profile 23 includes a recess 16, on which segments 13, 13' or the side walls 15, 15', 29 can be secured. Side walls 15, 15', 29 have an overlap region 6 with which at the curvature of line guidance unit 2, the channel 12 on side walls 15, 15', 29 is sealed. Moreover, the overlap region 6 provides additional stability to the line guidance unit 2 by assuming sideways forces applied to side walls 15, 15', 29. Segments 13, 13' are joined to overlap region 6 around the longitudinal axis of support strip 1 so that they cannot rotate. Such a line guidance unit 2 can be produced simply and cost-effectively and excels by high versatility and flexibility in application.

FIG. 2 shows segment 13 according to FIG. 1 in a perspective slanted view with side wall 15 and the opposite side wall 29 which are joined together by a first transverse bridge 19 and form channel 12. Furthermore, channel 12 is delineated by partial bridges 28. The side walls 15, 29 have an overlap region 6 through which segment 13 can be joined to a neighboring segment 13'. There is a first protrusion 17 below the first transverse bridge 19 and this can engage in recess 16 of support section 3 of support strip 1. Similarly, below the first transverse bridge 19, each of side walls 15, 29 has a second protrusion 26, 26' which face one another, where the support section 3 can be arranged between the first transverse section 19 and the second protrusions 26, 26'.

FIG. 3 shows segment 13 according to FIG. 2 in a front view, where the partial bridge 28 is designed as a second transverse bridge 27, so that the channel 12 is completely closed. It can also be seen that the support strip 1 can be fixed between the second protrusions 26, 26' and the first transverse bridge 19. Moreover, the first protrusion 17 contributes to this fixing because it engages into the recess 16 of support strip 1.

FIG. 4 shows the segment 13 according to FIG. 2 in a side view. Side wall 15 with the overlap region 6 for joining side wall 15 to a neighboring side wall can be seen.

FIG. 5 shows a composable segment in a perspective slanted view with joining means 15, which are formed by joining elements 18, with which side walls 15, 29 can be joined together. With its support section 13, support strip 1 is tensioned between joining element 18 and the second protrusion 26. A third protrusion 30, 30' contributes to further stabilization of line guidance unit 2 by the fact that a third protrusion 30 of a segment 13 engages between the third protrusion 30' of a neighboring segment 13'.

The overlap region is designed so that in the extended state the line guidance unit is arc-like with respect to a straight line connecting the two ends. As a result of this, pretensioning of the line guidance unit is achieved. For this purpose, the side walls in the overlap region are designed correspondingly.

Alternatively or additionally, at the upper end region of the walls, protrusions 33 can be formed through which the neighboring segments can be pivoted with respect to one another around a link axis lying in the support strip region, so that, in the unloaded state, the line guidance unit is curved in an arc-like fashion.

FIG. 6 shows a first section 4 of a support strip 1 according to the invention in a longitudinal sectional view. The support sections 3 are joined together by link sections 8, with the support sections 3 being designed as profiles 23.

FIG. 7 shows two sections joined together, a first section 4 and a second section 5, which are joined together so they can be separated. Here, the length of supports strip 1 can be lengthened or shortened, depending on the application. In order to produce a separable joint, a first joining piece 31 and a second joining piece 32 are used, which engage into one another and preferably can be clipped together.

FIG. 8 shows an alternative embodiment of the line guidance unit 2 according to the invention with segments 13 and side walls 15, where a first end 10 of the line guidance unit 2 can be fixed at a given location in space and a second end 11 of the line guidance unit 2 can be fixed to a movable part, for example, to a robot arm which is not shown.

FIG. 9 shows segment 13 according to FIG. 2 in a top view. The side walls 15, 29 have partial bridges 18. The side walls 15, 29 have overlap regions 6, 6'. They serve to stabilize the line guidance unit 2 against rotation along a longitudinal axis of support strip 1 or against tilting of two neighboring segments 13. Overlap regions 6, 6' seal channel 12 on the side.

FIG. 10 shows a side wall with an alternative design of overlap region 6, 6', where the overlap region 6, 6' is designed as a circular segment. This is especially advantageous when supporting strip 1 and the line guidance unit 2 are curved and thus the openings that form between segments 13, 13' must be covered.

Another embodiment of support strip 1 is shown in FIG. 11, where the support sections 3 are tubular, especially designed as hollow tubes, and the link sections 8 are designed as bridges. The first joining piece 31 represents a recess for the second joining piece 32. With the aid of the two joining pieces 31, 32, the support strip 1 can be lengthened arbitrarily or its length can be adjusted. Thus, the support strip 1 can also be fixed at its ends.

FIG. 12 shows another embodiment of the support strip 1 according to the invention with support sections 3 and link sections 8, where support section 3 and link section 8 have a trapezoidal and rhomboidal shape, respectively. As a result of the trapezoidal design of support section 13, a certain path that support strip 1 can describe in three-dimensional space is predetermined. In the case of isosceles trapezoids, the support strip 1 can perform a helical movement.

FIG. 13 shows a plate 20 with which a number of support strips 1 can be produced simultaneously, by having such a plate 20 with support strips 21 and link strips 22 be extruded or injection-molded in a two-component method and then cutting the plate 20 into support strips 1 in a direction transverse to the support strips 21 and link strips 22, respectively. Here, the direction of the cuts can run perpendicularly to the support strips 21 and link strips 22, respectively. However, they can also lie obliquely to it. As a result of this, trapezoidal link sections 8 and support sections 3 are produced.

The support strip 1 according to the invention of a line guidance unit 2 for active guidance of lines, cables or similar, is characterized by the fact that the support strip 1 has alternating support sections 3 and link sections 8 and the support sections 3 and the link sections 8 are made of materials with different properties using the multi-component method. With the aid of the support strip 1 according to the invention, the line guidance unit 2 which has such a support strip 1 can be used in a simple, robust and cost-effective manner for the guidance of lines, cables or similar.

FIG. 14 shows the side walls of neighboring segments. The side walls 15, 15' [sic, 13 is segment] have means through which the line guidance unit lies in an arc shape in the extended state with respect to the straight line that joins the two ends. The means have a common contact surface 34, imaginary lengthening of which in the extended state of the line guidance unit intersects the straight line that connects the two ends. The means are formed by overlapping regions. These overlapping regions can be the protrusions 30 described in FIG. 5.

REFERENCE LIST

1 Support-strip
2 Line guidance unit
3 Support sections
4 First section
5 Second section
6, 6' Overlap region
8 Link sections
10 First end
11 Second end
12 Channel
13, 13' Segments
14 Joining means
15, 15' Side wall
16 Recess
17 First protrusion
18 Joining element
19 First transverse bridge
20 Plate
21 Support strips
22 Link strips
23 Profile
25 Leadthrough
26, 26' Second protrusion
27 Second transverse bridge
28 Partial bridge
29 Opposite side wall
30, 30' third protrusion
31 First joining piece
32 Second joining piece
33 Protrusion
34 Contact surface
I Direction

The invention claimed is:

1. A line guidance unit for guiding lines, the line guidance unit having a loaded condition when lines are present in the line guidance unit and is substantially extended and pretensioned in an unloaded condition when lines are not present in the line guidance unit, and comprising:
   a first fixed end;
   a second movable end;
   a plurality of segments disposed between the first fixed end and the second movable end and each segment includes an overlap region and the segments define a line channel;
   a longitudinal support strip joining at least three segments at a connection and extending between the first fixed end and the second movable end; and
   a pretensioner including; a common contact surface on each segment overlap region, and at least one common contact surface is disposed at a distance from the connection such that the contact surface engages the common contact surface on an adjacent segment to pretension and form the line guidance unit into an arc-shape when the line guidance unit is in the substantially extended and unloaded condition when no lines are in the line channel, and such that the line guidance unit resists loads when the line guidance unit is in the loaded condition when lines are in the line channel.

2. The line guidance unit according to claim 1, wherein the pretensioner comprises:
   at least one common contact surface on each segment.

3. The line guidance unit according to claim 1 wherein the pretensioner is formed on a side wall of a segment.

4. The line guidance unit according to claim 1 wherein the pretensioner is formed on overlapping regions of adjacent segments.

5. The line guidance unit of claim 1 wherein the common contact surface is a bearing surface between a protrusion formed on a segment and an adjacent segment when the line guidance unit is in the extended and unloaded condition.

6. The line guidance unit of claim 5 wherein the support strip comprises a plurality of support sections that are trapezoidal in shape.

7. The line guidance unit of claim 5 wherein the support strip comprises a plurality of link sections that are rhomboidal in shape.

8. The line guidance unit of claim 1, wherein the support strip comprises alternating support sections and link sections and the support sections and the link sections are made from materials with different properties using a multi-component forming method.

9. The line guidance unit of claim 8, wherein the support sections and the link sections are manufactured by a multi-component injection molding method.

10. The line guidance unit of claim 8, wherein the support sections and the link sections are manufactured by a multi-component extrusion method.

11. The line guidance unit of claim 8, wherein the support sections define strength-enhancing profiles.

12. The line guidance unit of claim 8, wherein the support strip comprises at least two sections joined together.

13. The line guidance unit of claim 12, wherein the sections are joined together by positive locking mechanism.

14. The line guidance unit of claim 12 wherein the sections are releasably joined to one another.

15. The line guidance unit of claim 1 wherein the segments are joined to the support strip by a positive locking mechanism.

16. The line guidance unit of claim 1 wherein the segments are releasably joined to the support strip.

17. The line guidance unit of claim 1, wherein the segments defining a connector for joining the segments to the support strip.

18. The line guidance unit of claim 17, wherein the segments each comprise a side wall comprising a protrusion; and the support strip defines a recess for receiving the protrusion.

19. The line guidance unit of claim 18, wherein the support section defines a traverse leadthrough through which at least one joining element extends for joining side walls of a segment to the support strip.

20. The line guidance unit of claim 1 wherein at least one segment comprises side walls which are joined by a first transverse bridge and each of the side walls comprises opposing protrusions and a transverse bridge between which the support strip is disposed.

21. The line guidance unit of claim 1 wherein at least one segment comprises side walls; a first transverse bridge; and a second transverse bridge.

22. The line guidance unit of claim 1, wherein at least one segment comprises side walls and a partial bridge spanning at least part of the channel.

23. The line guidance unit of claim 1, and further comprising a second support strip joined to the segments.

24. The line guidance unit of claim 1, wherein the line guidance unit is substantially straight between the first end and the second end when the line guidance unit is in the loaded extended condition.

* * * * *